April 12, 1938. R. R. SMITH 2,113,631
ICE CUBE MACHINE
Filed Sept. 26, 1936 5 Sheets-Sheet 1
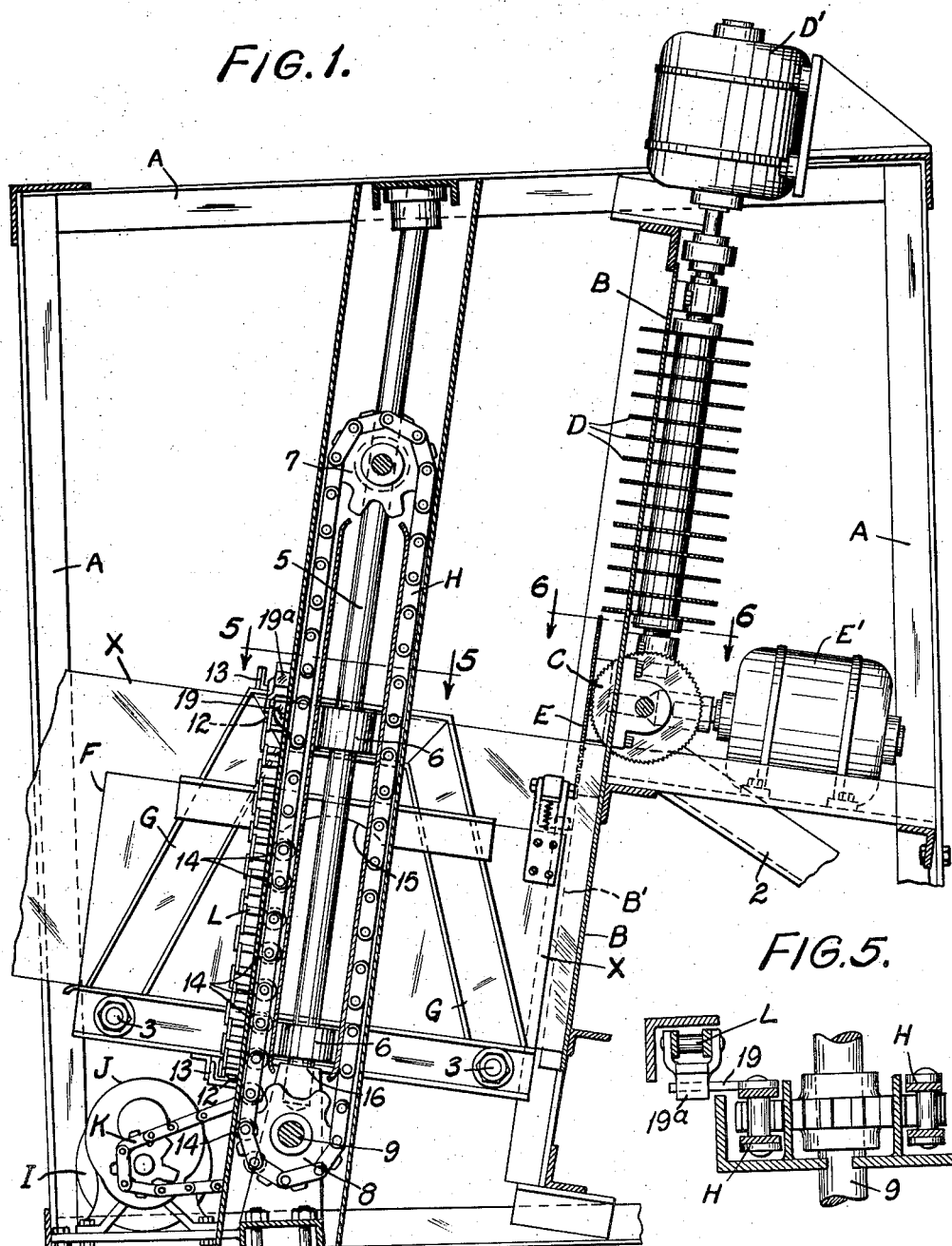
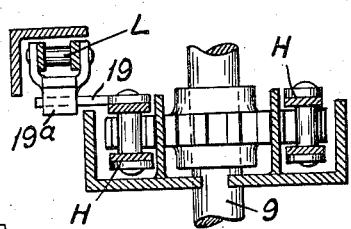
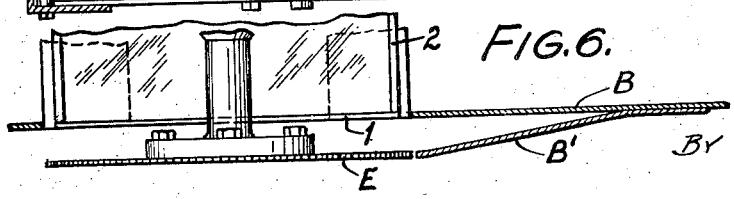
INVENTOR:
ROY R. SMITH,
By Wells R. Church
ATTORNEYS

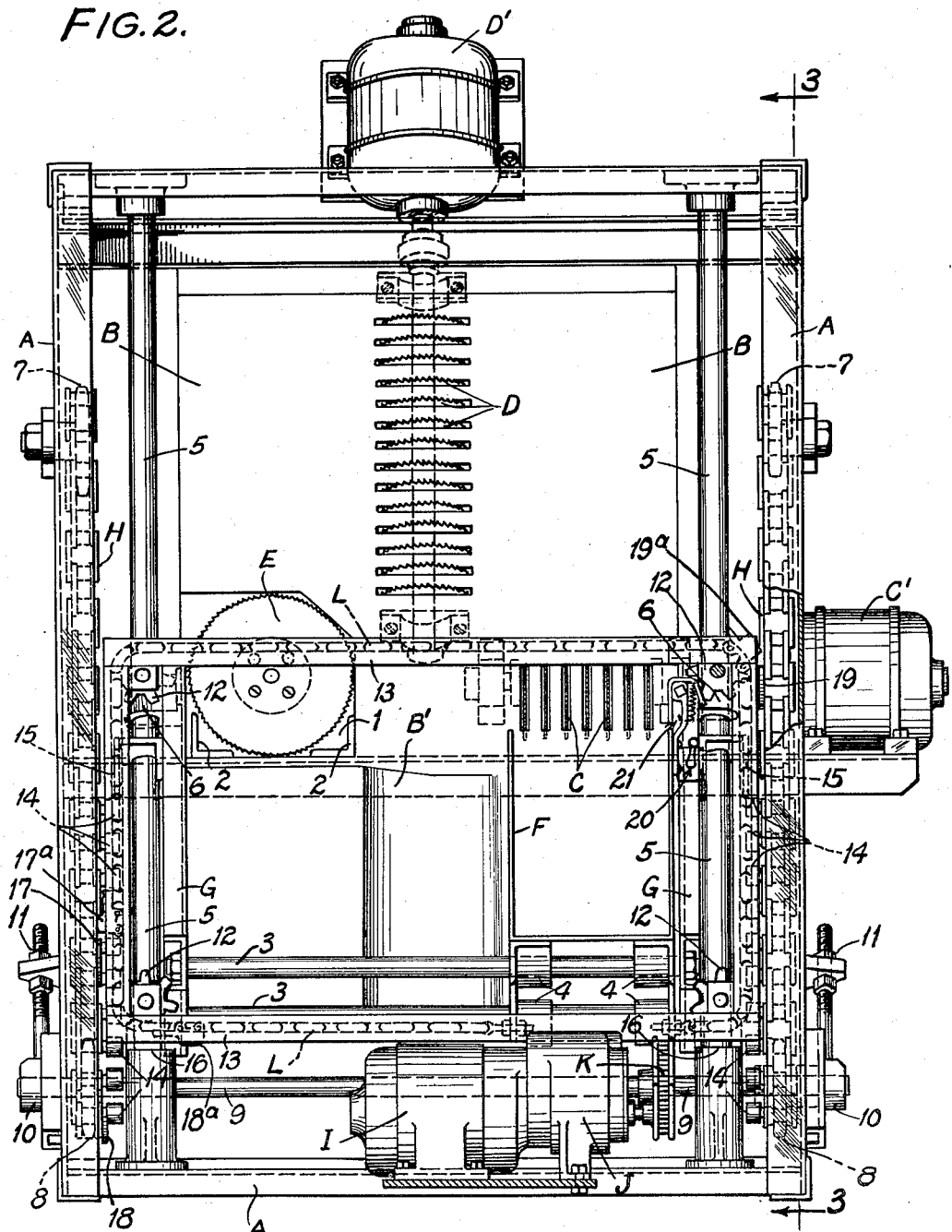

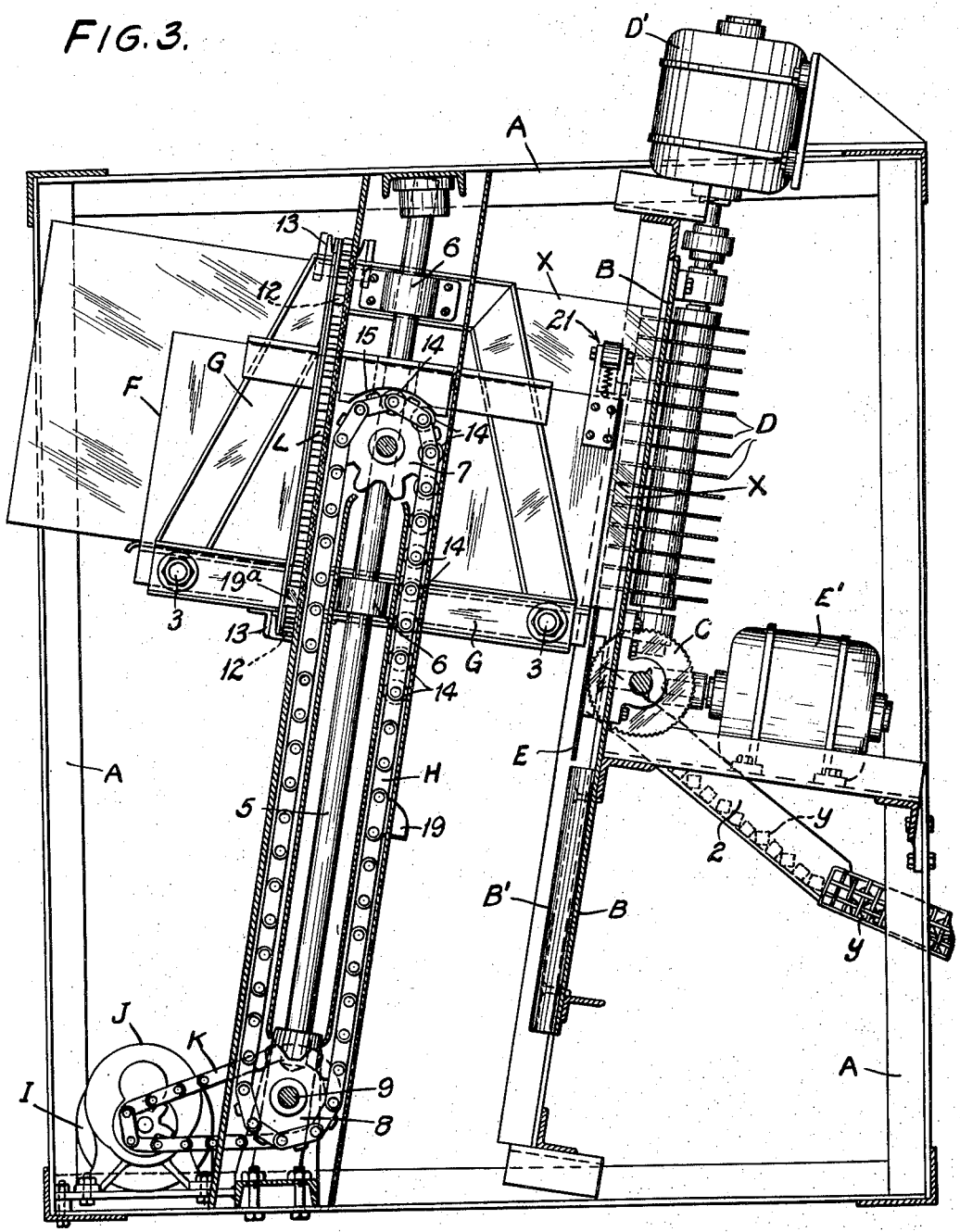

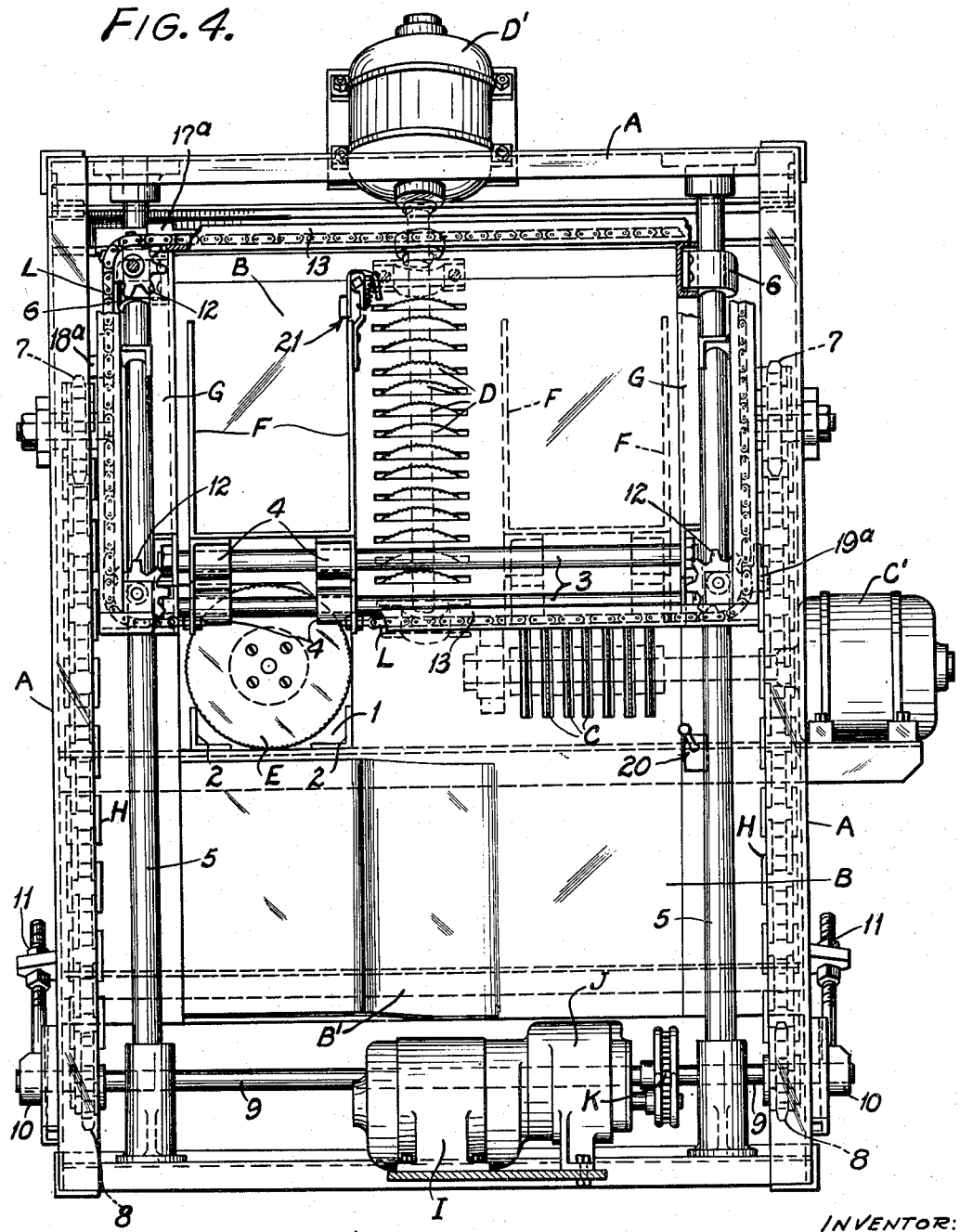

April 12, 1938.  R. R. SMITH  2,113,631
ICE CUBE MACHINE
Filed Sept. 26, 1936  5 Sheets-Sheet 5

INVENTOR:
ROY R. SMITH,
BY
ATTORNEY.

Patented Apr. 12, 1938

2,113,631

UNITED STATES PATENT OFFICE 2,113,631

ICE CUBE MACHINE

Roy R. Smith, Columbus, Ohio

Application September 26, 1936, Serial No. 102,671

5 Claims. (Cl. 143—38)

This invention relates to a machine for cutting a block of ice into a plurality of small cubes similar in size to the ice cubes produced in the trays of conventional electrical refrigerators.

The main object of my invention is to provide an ice cube machine that is completely automatic in its operation and of such design that it will take a large block of ice weighing several hundred pounds and cut it into several thousand small cubes in a few minutes.

Another object is to provide an ice cube machine of the kind above referred to that is reliable in operation, simple in design, and of rugged construction.

Other objects and desirable features of my invention will be hereinafter pointed out.

To this end I have devised an ice cube machine that is composed of a carrier on which a block of ice is adapted to be placed, means for moving said carrier through a definite path or circuit, and cutting devices arranged adjacent said path or circuit in such a way that at each cycle of operations of the carrier, a portion of the block of ice will be cut into a plurality of small cubes. It is immaterial what type or kind of cutting devices are used to slit, slot or groove the block of ice and thereafter cut off the slotted portion of the block to form cubes, but in the machine herein illustrated, which represents the preferred form of my invention, two separate and distinct gangs of rotary saws are used to form vertical and horizontal intersecting slots in one end of the block of ice, and a separate rotary cut-off saw is used to sever or cut off the slotted end portion of said block from the remainder of the block.

The carrier on which the block of ice is positioned is preferably constructed and operated so that it will move in a substantially rectangular-shaped path in front of an upright abutment surface or back plate against which one end of the block of ice bears, and the gangs of saws that form the intersecting slots in one end of the block are mounted in said abutment surface in such a way that during a portion of the travel of the block through its circuit, a plurality of vertically disposed parallel slots or grooves will be formed in the block and, during a different portion of the travel of the block, a plurality of horizontally disposed parallel slots or grooves will be formed in said block to intersect the vertical slots. After being slotted as above described, the direction of travel of the block is again changed so as to present the slotted portion of the block to the cut-off saw, and after being acted upon by said cut-off saw, the block again changes its direction of travel and returns to the point from which it started at the beginning of the cycle.

The carrier which holds the block of ice and feeds it to the slotting and cut-off saws can be constructed and operated in various ways without departing from the spirit of my invention, but I prefer to construct said carrier so that it is capable of reciprocating back and forth horizontally on a carriage that reciprocates back and forth vertically, the combined movement of said carrier and carriage making it possible to move the block of ice through a path or circuit of substantially rectangular shape. In the machine herein illustrated, sprocket chains are used to actuate the vertically reciprocating carriage on which the block carrier is mounted, and the movement of said sprocket chains is also used to actuate the carrier or move it horizontally relatively to the carriage which sustains said block carrier.

Figure 1 of the drawings is a side elevational view, partly broken away, of an ice cube machine constructed in accordance with my invention.

Figure 2 is a front elevational view of said machine.

Figure 3 is a vertical transverse sectional view taken on the line 3—3 of Figure 2, illustrating the parts of the machine in a different position from that shown in Figure 1.

Figure 4 is a front elevational view with the parts of the machine in a different position from that shown in Figure 2.

Figure 5 is an enlarged sectional view taken on the line 5—5 of Figure 1 for the purpose of illustrating how the operating chains for the carriage are used to impart transverse movement to the carrier on which the block of ice is positioned.

Figure 6 is an enlarged sectional view taken on the line 6—6 of Figure 1 and

Figure 7:
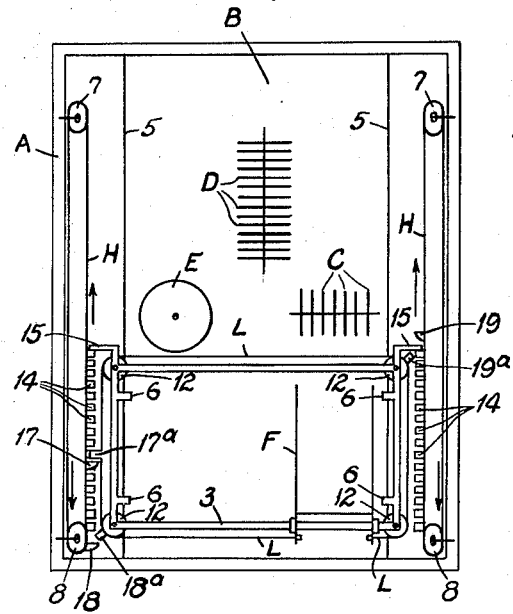
Figures 7 to 10 are diagrammatic views illustrating how the carrier for the block of ice moves through a rectangular path or circuit to present the block of ice to the slotting saws and cut-off saw.

In the accompanying drawings which illustrate the preferred form of my invention, A designates as an entirety the frame of the machine which is herein illustrated as consisting of two substantially rectangular-shaped, vertically disposed, side members rigidly connected together by horizontally disposed top and bottom cross pieces. Disposed vertically of said frame is an upright abutment surface or back plate B against which the front end of the block of ice x bears during the operation of slotting and cutting said block to form ice cubes y. The slotting mechanism comprises a gang of vertically disposed rotary saws C, positioned in vertical slots in the abutment surface or back plate B, and a gang of horizontally disposed rotary saws D, positioned in horizontal slots in said abutment surface as shown in the drawings, said saws C and D being arranged so that they project forwardly a slight distance beyond the front face of the abutment surface B. An electric motor C' is provided for driving the vertically disposed saws C, and a separate electric motor D' is provided for driving the horizontally disposed saws D, said electric motors being mounted on suitable brackets on the frame A of the machine, and each gang of saws being attached to a separate shaft that is directly connected to the motor which drives the gang. The cut-off saw previously referred to consists of a rotary saw E driven directly by an electric motor E' and arranged in front of the abutment surface B in parallel relationship to same, and in vertical alignment with an opening 1 in said abutment surface through which the ice cubes y are discharged into a discharge chute 2 as shown in Figures 1 and 3, the cut-off saw E being spaced away from the front side of said abutment surface a distance equal to or corresponding to one of the dimensions of ice cubes y.

Figure 9:
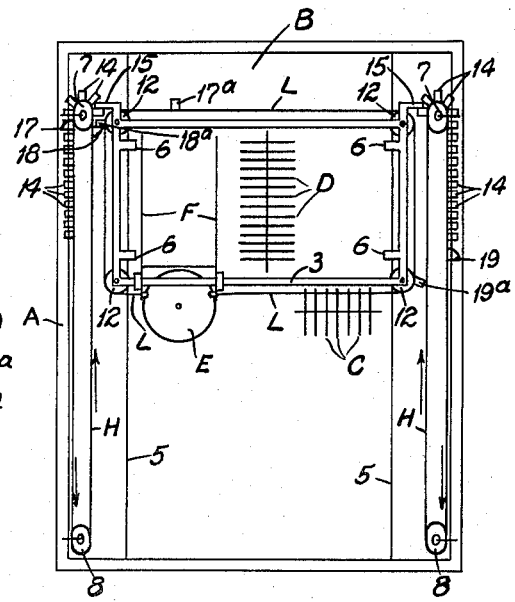
Figure 8:
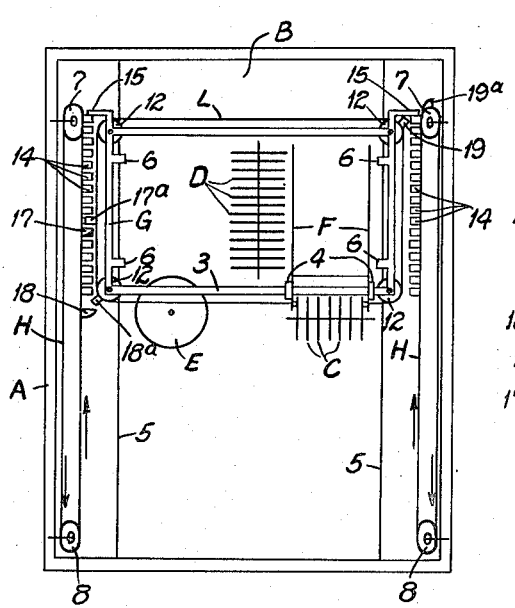
Figure 10:
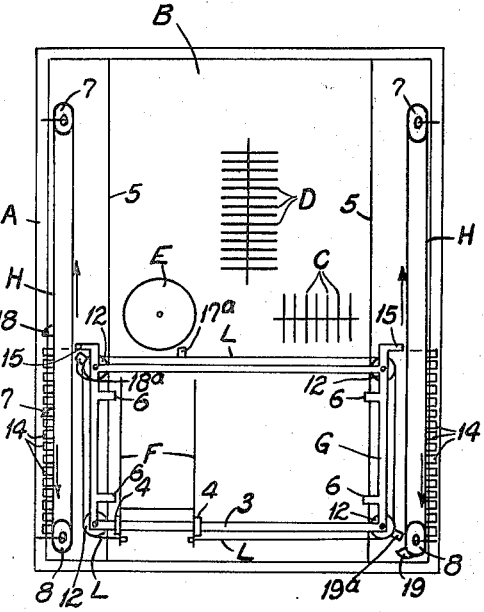

The means that is used to support the block of ice and feed it to the slotting saws and cut-off saw above described is arranged in front of the back plate or abutment surface B and, in the machine herein illustrated, is composed of a carrier F that receives the block of ice x, reciprocatingly mounted on a reciprocating carriage G, the carriage G being constructed so that it moves upwardly and downwardly in a substantially vertical direction, and the carrier F being constructed so that it moves transversely of said carriage in a substantially horizontal direction. After the block of ice has been placed on the carrier F with the front end of said block bearing against the abutment surface B, the carriage G moves upwardly so as to move the carrier F from the position shown in Figure 7 into the position shown in Figure 8, thereby causing the vertically disposed saws C to form numerous parallel slots, grooves or slits in the front end portion of the block of ice x mounted on the carrier. The carriage G remains at rest in its elevated position for a short period and during this period the carrier F moves horizontally, transversely of the carriage, to the position shown in Figure 9 thereby causing the horizontally disposed saws D to form numerous parallel horizontal slots, slits or grooves in the front end portion of the block of ice sustained by the carrier, the said horizontal slots intersecting the vertical slots produced by the saws C. At the completion of the above described slotting operation, the carriage G descends, thus moving the carrier F into the position shown in Figure 10 and during this downward movement of the carriage G the cut-off saw E cuts off the slotted end portion of the block of ice and thus produces ice cubes y which pass rearwardly through the opening 1 in the back plate and fall into the discharge chute 2 as shown in Figure 3. The details of construction of the carrier F and carriage G are immaterial and various means may be used to actuate or operate said parts so as to move the block of ice through the path or circuit through which it travels during the slotting and cutting off operation. In the machine herein illustrated, the carriage G is composed of two substantially triangular shaped end frames (see Figure 3) rigidly connected together by a plurality of transversely disposed horizontal members some of which are formed by rods 3 that form slide-ways on which the carrier F moves transversely of the carriage G during the slotting or slitting operation as previously explained. The carrier F preferably consists of an open-ended trough provided at its lower end with sleeve-like bearing pieces 4 that surround and slide upon the horizontally disposed rods 3 which form part of the carriage G, the bearing sleeves 4 being arranged adjacent the front and rear ends of the carrier F so as to provide an adequate bearing for the carrier and thus produce a carrier that is capable of holding a block of ice weighing several hundred pounds.

In some of the machines embodying my invention that have been made and sold, the open-ended trough constituting the carrier F is made of such dimensions that it is capable of receiving a block of ice approximately forty-five inches long, approximately twenty-two inches deep, approximately eleven inches wide, and weighing approximately three hundred pounds. A block of ice of the above dimensions contains sufficient material to produce twenty-five hundred ice cubes, and one of the advantages of my machine is that this relatively great number of ice cubes, namely, twenty-five hundred, can be produced in seven minutes with practically no care or attention on the part of the operative who has charge of the machine, due to the fact that after the machine has been set in operation, the carrier F will travel repeatedly through a rectangular-shaped path or circuit and cause the block of ice to be fed to the saws in such a way that the saws progressively cut up transverse sections of the ice block into sharp-edged cubes that are discharged automatically into an eduction chute, and when the entire block of ice has been consumed or substantially consumed, the machine will be stopped automatically by a limit switch controlled by a tripping device on the carrier which becomes operative automatically when all of the block of ice except the frosted rear end portion of same has been consumed or cut up into cubes. In order to simplify the construction of the machine and overcome the necessity of using springs, weights or equivalent mechanical means to feed the block of ice forwardly in the carrier after the block has been acted upon by the cut-off saw E, I prefer to arrange the carrier F in an inclined position with its front end pitched downwardly as shown in Figure 1, and dispose the abutment surface or back plate B at such an angle that when the block of ice is placed in the carrier, gravity will move said block forwardly or to the right, looking at Figure 1, and thus hold the front end of the block squarely against the front side of the back plate B. Similarly, after the slotted end portion of the block has been severed from the remainder of the block, gravity causes the block to move forwardly so as to cause the freshly cut front end of the block to bear against the back plate B at the beginning of the next cycle of operations. In order to accurately guide the block forwardly at the completion of the cutting-off operation, a transversely inclined guide B' is arranged on the front side of the back plate B at a point below the cut-off saw so as to form, in effect, an abutment surface over which the front end of the block of ice slides while the block is moving transversely of the carriage back to the position shown in Figure 7 where the cycle starts.

The vertically moving carriage G is guided by upright rods 5 arranged in a slightly inclined position and rigidly attached at their upper and lower ends to cross members of the frame A of the machine, the triangular-shaped end frames of the carriage G being provided with sleeve-like top and bottom bearings 6 that surround and slide freely upon the guide rods 5. One or more sprocket chains are used to actuate or reciprocate the carriage G and in the machine herein illustrated, two sprocket chains H are arranged in an upright position at points beyond or outside of the stationary guide rods 5, said sprocket chains H passing over idler top sprockets 7, carried by suitable bearings attached to the frame A of the machine and over driving sprockets 8 arranged in spaced relationship with the top sprockets, and attached to a horizontally disposed drive shaft 9 that is driven in any suitable way as, for example, by electric motor I, a reducing gear J, and a drive chain K as shown clearly in Figures 1 and 2. In order to take up slack in the sprocket chains H, the bearings 10 for the drive shaft 9 are provided with adjusting devices 11 shown in Figures 2 and 4 that are adapted to vary the distance between the drive shaft 9 and the axis of rotation of the top sprockets 7. As previously explained, the carrier F in which the block of ice is positioned, is provided at its lower end with bearings 4 that slide laterally on horizontally transversely disposed guide rods 3 which form part of the carriage G. Transverse movement is imparted to said carrier by a flexible element, such for example as a separate and distinct sprocket chain L that travels over four idler sprockets 12 that are rotatably mounted on the carriage G as shown in Figure 4. One end of the chain L is attached to the right-hand end of the carrier F and leads upwardly from same over two of the sprockets 12 and thence horizontally and downwardly over the other two sprockets, the opposite end of said chain being attached to the left-hand side of the carrier F. Consequently, if the sprocket chain L is moved in one direction, the carrier F will move transversely of the carriage G to the right, and if said chain L is moved in the opposite direction, the carrier F will move transversely of the carriage G to the left. Preferably, the carriage G is provided with horizontally disposed channel-shaped cross pieces 13 that act as tracks or guide-ways for the chain L.

The sprocket chains H are provided with laterally projecting devices that co-act with parts on the carriage G to move said carriage upwardly and also control the downward movement of said carriage and said sprocket chains are also provided with laterally projecting devices that cooperate with the horizontally disposed sprocket chain L attached to the carrier F to move said carrier transversely relatively to the carriage G. In the machine herein illustrated the laterally projecting devices on the vertically disposed chains H which are used to actuate or reciprocate the carriage G, consist of a group of laterally projecting rollers 14 on each of said chains disposed so that during a portion of the travel of the chains H the rollers 14 will co-act with laterally projecting bearing pieces 15 at the upper end of the carriage G to move said carriage upwardly; during a different portion of the travel of said sprocket chains H said rollers 14 and bearing pieces 15 will co-act with each other to hold the carriage at rest in its elevated position, and during still another portion of the travel of said sprocket chains, said parts 14 and 15 will co-act with each other to control the downward movement of the carriage G. The sprocket chains H travel in the direction indicated by the arrows in Figure 7 and at the beginning of the cycle of operations of the carrier F, the first roller of each group of rollers on the chains H moves into engagement with its co-acting bearing piece 15 on the carriage with the result that the continued upward movement of the sprocket chains H causes the carriage G to move upwardly into the position shown in Figure 8. After reaching this elevated position the carriage G comes to rest but the sprocket chains H continue in operation with the result that the remainder of the group of rollers 14 thereon travel over curved or concave shaped surfaces on the bearing pieces 15 and in so doing act, in effect, as relatively long supporting surfaces on the sprocket chains which co-act with the bearing pieces 15 on the carriage G to hold said carriage at rest during the time the portions of the chains H that carry the rollers 14 are passing over or travelling around the top sprockets 7. When the last roller of each group of rollers 14 on the chains H passes its co-acting bearing piece 15, there will be nothing to sustain the carriage G and hence said carriage will start to move downwardly, the downward movement of said carriage being governed or controlled by reason of the fact that the bearing pieces 15 on the carriage follow and rest upon the last rollers of the groups of rollers 14 on the sprocket chains H. After the carriage G has reached its bottom position shown in Figures 1 and 2, it is sustained in this position by the sleeve-like bearings 6 at the lower end of the carriage which rest upon abutment pieces 16 at the lower ends of the guide rods 5.

As previously explained, the sprocket chains H are also used to actuate the horizontally disposed chain L to move the carrier F transversely of the carriage G. In the machine herein shown the left-hand sprocket chain H is provided with two laterally projecting devices 17 and 18 (see Figure 7) that cooperate with devices 17a and 18a on the chain L to move said chain L in a direction to shift the carrier F transversely of the carriage G into the position shown in Figure 9. this transverse movement being imparted to the carrier while the carriage G is sustained in its elevated position by cooperation of the rollers 14 on the sprocket chains H with the bearing pieces 15 on the carriage as previously explained. While the carriage is travelling downwardly from the position shown in Figure 9 into the position shown in Figure 10, the carrier F remains in its left-hand position, but as soon as the carriage G reaches the lowermost position, shown in Figure 10, a laterally projecting device 19 on the right-hand sprocket chain H moves into engagement with a co-acting device 19a on the chain L, and during the succeeding portion of the movement of the sprocket chains H the said devices 19 and 19a co-act with each other to move the carrier F transversely to the right back to its starting position shown in Figure 7, the device 19 on the right-hand sprocket chain H passing out of engagement with the device 19a on the chain L just before the first rollers of the groups of rollers 14 on the sprocket chains H move into engagement with the bearing pieces 15 on the carriage G. It will thus be seen that in my improved machine the combined action of the carrier F and carriage G causes the block of ice to move upwardly over the saws C, then horizontally to the left over the saws D, then downwardly over the cut-off saw E, and then horizontally to the right back to starting position, the said cycle being repeated until the entire block of ice is consumed or until the frosted rear end portion of the block has been reached. Each time the slotted end portion of the block of ice is cut off, the block of ice will move forwardly automatically into engagement with the abutment surface or back plate B of the machine due to the angle at which the carrier F is arranged, and after the block of ice has been consumed or practically consumed, the machine will stop automatically.

Various means may be used to automatically stop the machine, but I prefer to use for this purpose an electric switch 20 arranged in the motor circuit of the operating mechanism for the carriage and carrier, and a tripping device 21 for said switch 20, constructed so that said tripping device will be inactive so long as the carrier F contains sufficient ice to produce a batch of cubes, and will become active automatically after the block of ice has been consumed or substantially consumed. In the machine herein illustrated the switch tripping device 21 on the carrier consists of a spring actuated element mounted at the front end of the carrier F in such a position that it is maintained in its inactive or inoperative position by engagement of the block of ice with said spring actuated element. After the block or all except the frosted rear end portion of the block has been consumed, there will be no pressure to hold said spring actuated element in its inactive position and, consequently, its actuating spring will move it into a position to engage and move the switch 20 in a direction to open the energizing circuit and thus cause the sprocket chains H to cease operating.

A machine of the construction above described is of sufficiently rugged construction and simple design to stand up successfully under the comparatively rough or heavy usage to which such machines are subjected. It has high speed, rotary saws that cut the ice squarely and evenly and produce cubes of perfectly regular shape having sharp edges, and it requires practically no attention on the part of the operative in charge of the machine for, after the block of ice has been placed in the carrier F and the machine started, the machine will progressively cut transverse sections of the block into cubes and will stop automatically after the block has been consumed or substantially consumed.

Having thus described my invention, what I hold as new and desire to secure by Letters Patent is:

1. An ice cube machine, comprising an upright abutment plate, two gangs of rotary saws disposed at an angle to each other and arranged so as to project slightly beyond said abutment plate, upright guides arranged in front of said abutment plate, a vertically movable carriage that travels on said guides, a horizontally movable carrier slidingly mounted on said carriage and constructed to hold a block of ice whose end is in engagement with said abutment plate, sprocket chains equipped with devices that engage with and disengage from devices on the carriage, whereby the engagement acts to raise the carriage, then hold the carriage at rest in an elevated position, and the disengagement thereafter acts to permit the carriage to move downwardly, and additional devices on said sprocket chains that cooperate with elements attached to the carrier for moving the carrier transversely of the carriage when the carriage is at rest in its elevated position, and also when the carriage is at rest in its lowermost position.

2. An ice cube machine, comprising an upright back plate or abutment surface arranged in a slightly inclined position, two gangs of rotary saws mounted in slots in said back plate and arranged at right-angles to each other, a cut-off saw arranged in front of said back plate adjacent a discharge opening in said back plate, upright guides arranged in front of said back plate in an inclined position, a vertically reciprocating carriage mounted on said guides, sprocket chains provided with groups of laterally projecting devices that engage with and disengage from devices on the carriage, whereby the engagement acts to raise the carriage, hold it at rest in an elevated position for a certain period and the disengagement permits the carriage to move downwardly, a horizontally movable carrier mounted on said carriage for holding a block of ice whose front end is in engagement with said back plate, a second sprocket chain attached to said carrier, and additional devices on the first mentioned sprocket chains which cooperate with said second sprocket chains to move the carrier transversely of the carriage in one direction, when the carriage is in its elevated position, and also move the carrier transversely of the carriage in the opposite direction, when the carriage is in its lowermost position.

3. In an ice cube machine, the combination of a vertically movable carriage, a horizontally movable ice block carrier mounted on said carriage so as to be capable of moving relatively to the same, a driven sprocket chain provided with a means that moves into and out of engagement with a means on the carriage, whereby the engagement acts to first, raise the carriage, and second, hold the carriage at rest in an elevated position while the chain continues in motion; and the disengagement permits the carriage to descend, a separate and distinct means operated by said chain for moving the carrier horizontally transversely of the carriage while the carriage is at rest, and means for scoring the block of ice sustained by the carrier.

4. In an ice cube machine, the combination of two gangs of rotary saws disposed at an angle to each other, a cut-off saw, a vertically movable carriage, a horizontally movable ice block carrier mounted on said carriage so as to be capable of moving relatively to same, a driven sprocket chain provided with a means that engages with and disengages from a part on the carriage, whereby the engagement acts to raise the carriage, then hold the carriage at rest in an elevated position, and the disengagement permits the carriage to move downwardly, a flexible element attached to said carrier for moving the carrier transversely of the carriage, and a separate actuating device on said chain for imparting movement to said flexible element.

5. In an ice cube machine, the combination of a vertically movable carriage, a horizontally movable ice block carrier mounted on said carriage so as to be capable of moving relatively to same, a pair of driven sprocket chains provided with devices arranged so that the movement of the chains causes said devices to move into and out of engagement with devices on the carriage, whereby the engagement raises the carriage, then holds the carriage at rest in an elevated position while the chains continue in motion, and the disengagement permits the carriage to descend, a flexible element attached at its ends to the carrier and arranged to travel over guides on the carriage, separate actuating devices on said chains that coact with said flexible element to move the carrier horizontally of the carriage in opposite directions, and a scoring and cut-off means arranged in the path of travel of the ice block on the carrier.

ROY R. SMITH.